United States Patent Office 3,749,768
Patented July 31, 1973

3,749,768
ARTIFICIALLY COLORING THE SKIN WITH TETRAZOLIUM SALTS
Gregoire Kalopissis, Paris, and Andree Bugaut, Boulogne, France, assignors to Societe Anonyme dite L'Oreal
No Drawing. Filed Mar. 13, 1969, Ser. No. 807,085
Claims priority, application France, Mar. 14, 1968, 143,832
Int. Cl. A61l 23/00
U.S. Cl. 424—59                6 Claims

ABSTRACT OF THE DISCLOSURE

An artificial skin-tanning lotion comprising at least one of certain tetrazolium salts, preferably in combination with a reducing agent.

SUMMARY OF THE INVENTION

Artificial "tanning" lotions have been known for many years. When these compositions have been applied to the skin, they impart thereto a coloration analogous to that which results from more or less prolonged exposure to sunlight.

Compositions having a hydroxy-acetone or erythrulose base, in particular, have already been used for this purpose. These compositions, which impart a deep yellow color to the skin, have however, the disadvantage that they act relatively slowly. It ordinarily takes at least an hour for these compositions to impart to the skin the color which they are intended to produce.

These disadvantages are particularly objectionable when these slow-acting compositions are not applied to the skin in a sufficiently uniform manner. In this case unevenly colored areas appear on the skin at a time when it is often too late to easily correct these inequalities, which result from a failure to apply the composition in a uniform manner.

On the other hand these compositions generally produce only yellowish colors, which are not always attractive in certain cases and permit only a small variety in the tints which it is possible to produce on the skin.

The present invention relates to new compositions designed to impart to the skin a coloration which differs from its natural colors, and which permits a broad range of colors to be imparted to the skin. In the preferred embodiment, at least, the compositions according to the invention have the remarkable advantage that they act very rapidly so that the result may be seen almost immediately after the application.

The present invention rests on the surprising discovery that the tetrazolium salts, which are colorless compounds, are transformed easily and rapidly into colored formazanes when brought into contact with the skin, as a consequence of the reducing action of the enzymes in the skin, which may be combined with the action of other reducing agents incorporated into the composition.

It is the object of the present invention to provide a new method of coloring the skin which is characterized by the fact that a composition containing at least one tetrazolium salt corresponding to the following formula, in a suitable cosmetic support, is applied to the skin.

$$\left[ \begin{array}{c} Y-R-\overset{+}{N}=N \\ \phantom{Y-R-}\big| \phantom{=N}\diagdown \\ \phantom{Y-R-}R''-N-N \diagup C-R' \end{array} \right] [A^-]_n$$

In this formula:

$n$ is a whole number equal to 1 or 2.
R represents a phenyl radical unsubstituted or substituted by nitro or methoxy groups.
R' represents a hydrogen atom, a methyl radical, a phenyl radical substituted or unsubstituted by one or several methoxy groups or by a group of the following formula:

$$\text{O}-\!\!\!\diagup\!\!\!\diagdown\!\!\!-\varphi\!\!\!-\!\!\!\diagup\!\!\!\diagdown\!\!\!-$$
$$\phantom{\text{O}-}\big|$$
$$\phantom{\text{O}}\text{CH}_2-\text{O}$$

R'' represents a phenyl or phenylene radical unsubstituted or substituted by methoxy groups.
Y represents hydrogen, when $n=1$, and the radical $$-R-\overset{+}{N}=N$$
$$\phantom{-R-}\big| \phantom{=N}\diagdown$$
$$\phantom{-R-}R''-N-N\diagup C-R'$$

when $n=2$.
$A^-$ represents an anion, for example, a halide, methosulfate, sulfate, acetate.

Among the tetrazolium salts which may be used to carry out the process according to the invention are:

3-paranitrophenyl-2,5-diphenyl tetrazolium chloride corresponding to the formula:

$$\left[ \begin{array}{c} O_2N-\!\!\diagup\!\!\diagdown\!\!-\!\!\diagup\!\!\diagdown\!\!-\overset{+}{N}=N \\ \phantom{xxxxxxxxxxx}\diagdown \\ \phantom{xxxxxxxxxxx}C-H_5C_6 \\ \phantom{xxxxxxx}C_6H_5-N-N\diagup \end{array} \right] Cl^-$$

3-orthomethoxyphenyl-2,5-diphenyl-tetrazolium chloride corresponding to the formula:

$$\left[ \begin{array}{c} \diagup\!\!\diagdown\!\!-\overset{+}{N}=N \\ \phantom{xxxxx}\diagdown \\ H_3C-O\phantom{xx}C-H_5C_6 \\ \phantom{xxx}C_6H_5-N-N\diagup \end{array} \right] Cl^-$$

3,3'-para(diorthomethoxy)diphenylene - 2,2'-5,5' - tetraphenyl-ditetrazolium chloride having the formula:

$$\left[ C_6H_5-C \begin{array}{c} N-N-H_5C_6 \\ \diagup \\ \diagdown \\ N=N \\ + \end{array} \!\!\!-\!\!\diagup\!\!\diagdown\!\!-\!\!\diagup\!\!\diagdown\!\!-\!\!\!\begin{array}{c} C_6H_5-N-N \\ \diagup \\ \diagdown \\ N=N \\ + \end{array} C-H_5C_6 \right] 2Cl^-$$
$$\phantom{xxxxxxxxxxxx}\text{OCH}_3 \phantom{xxxxxxxxx} \text{OCH}_3$$

3,3' - dimethoxy - 4,4'-diphenylene-3,3'-diphenyl-2,2'-bis-3,4-piperonyl-5-tetrazolium chloride, $$\left[ \begin{array}{c} \text{CH}_2-\text{O} \\ \big| \\ \text{O}-\!\!\diagup\!\!\diagdown\!\!-\varphi \end{array}\!\!-C \begin{array}{c} N-N-\!\!\diagup\!\!\diagdown\!\!-\varphi\!\!-\!\!\diagup\!\!\diagdown\!\!-\varphi\!\!-N=N \\ \diagdown \\ N=N \\ + \end{array}\!\!-\!\!\diagup\!\!\diagdown\!\!-\varphi\!\!-\!\!\diagup\!\!\diagdown\!\!-\varphi\!\!-\!\!\!\begin{array}{c} N-N \\ \diagup \\ \diagdown \\ N=N \\ + \end{array} C\!\!-\!\!\diagup\!\!\diagdown\!\!-\varphi\!\!-\!\!\!\begin{array}{c} O-\!\!-\!\!CH_2 \\ \big| \\ O \end{array} \right] 2Cl^-$$
$$\phantom{xxxxxxxxxxx}\text{OCH}_3 \phantom{xxxxxxxxx} \text{OCH}_3$$

4,4' - diphenylene - 3,3' - bis(phenyl 2)-4,4'-dimethoxy phenyl-5,5'-tetrazolium chloride, $$\left[ H_3CO-\!\!\diagup\!\!\diagdown\!\!-\varphi\!\!-C \begin{array}{c} N-N=\!\!\diagup\!\!\diagdown\!\!-\varphi\!\!-\!\!\diagup\!\!\diagdown\!\!-\varphi\!\!-N-N \\ \diagdown \\ \big| \\ N=N \\ + \end{array}\!\!-\!\!\diagup\!\!\diagdown\!\!-\varphi\!\!-\!\!\diagup\!\!\diagdown\!\!-\varphi\!\!-\!\!\!\begin{array}{c} N-N \\ \diagup \\ \big| \\ N=N \\ + \end{array} C\!\!-\!\!\diagup\!\!\diagdown\!\!-\varphi\!\!-\!\!OCH_3 \right] 2Cl^-$$

O - methoxyphenyl - 3-phenyl-2-p-methoxyphenyl-5-tetrazolium chloride

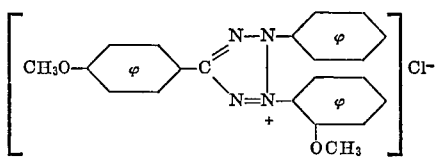

O - methoxyphenyl-3-phenyl 2,3,4-piperonyl-5-tetrazolium chloride,

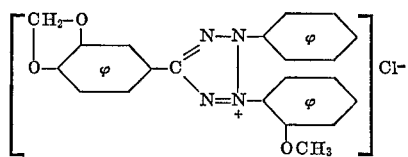

Diphenyl 3,2-p-methoxyphenyl-5-tetrazolium chloride,

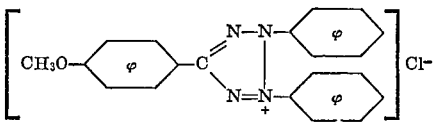

O - methoxyphenyl-3-phenyl-2-(2,4,5-trimethoxyphenyl)-5-tetrazolium chloride,

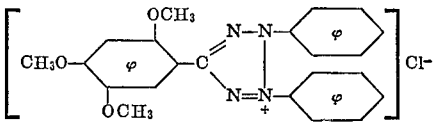

p - Nitrophenyl-3-phenyl-2-p-methoxyphenyl-5-tetrazolium chloride,

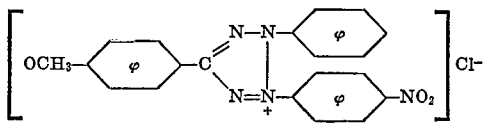

(2 methoxy - 4-nitrophenyl)-3 phenyl-2-p-methoxyphenyl-5-tetrazolium chloride,

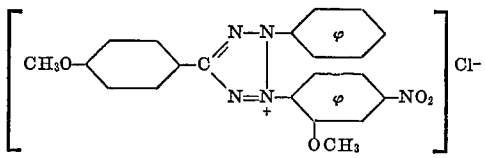

p - Nitrophenyl-3-phenyl-2-(3,4-piperonyl)-5-tetrazolium chloride,

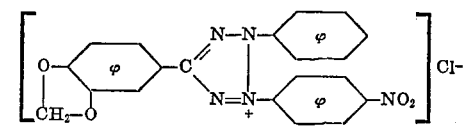

(2 methoxy-4-nitrophenyl)-3-phenyl-2-(3,4-piperonyl)-5-tetrazolium chloride,

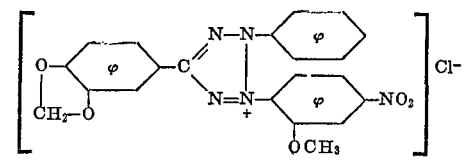

m-Nitrophenyl-3-phenyl-2-methyl-5-tetrazolium chloride,

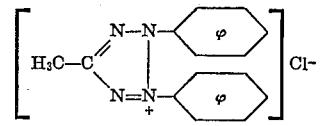

3,3'-para(diorthomethoxy) diphenylene-2,2'-diphenyl-5,5'-para anisyl-ditetrazolium chloride having the formula:

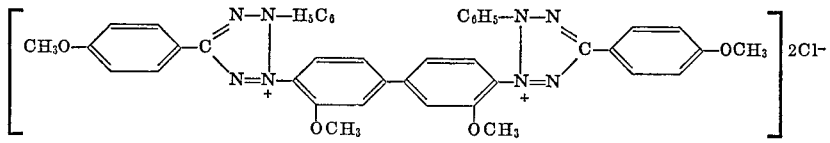

3,3' - paradiphenylene-2,2',5,5'-tetraphenyl-ditetrazolium chloride having the formula:

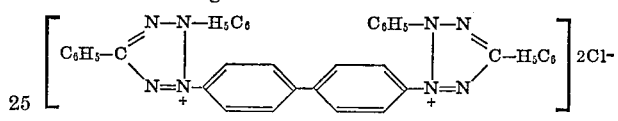

2,3,5-triphenyl-tetrazolium chloride having the formula:

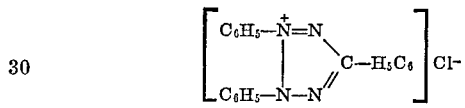

In accordance with a preferred embodiment of the process according to the invention, a composition is applied to the skin which contains, in addition to the tetrazolium salt, a reducing compound which is harmless to the skin, and the oxidoreduction potential of which is lower than the oxidoreduction potential of the tetrazolium salt-formazane system.

Tetrazolium salt is reduced in a colored formazane, according to to the following reaction:

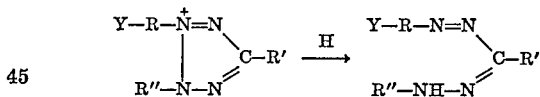

Among the reducing compounds which may be used simultaneously with the tetrazolium salts are sodium hydrosulfite, sodium borohydride, the thiols and sodium ascorbate.

Among the thiols which may be used as reducing compounds are the thioglycolic acid, the thiolactic acid, the glycol-thioglycolate, the glycol-thiolactate, the β-mercaptoethanol.

In an alternative method of carrying out the invention the tetrazolium salts are associated with a reducing agent which has, in itself, dyeing properties.

It is thus possible to use with the tetrazolium salts such substances as the leuco derivatives of the anthraquinone series, the leuco derivatives of carmine and of indigo, as well as the leuco derivatives of all the sulfonates of indigo and of thioindigos.

It is also possible to use in carrying out the invention skin coloring compositions which contain, in addition to tetrazolium salts, hydroxyl dyes of the benzene, naphthalene and indole series, such as trihydroxy-benzene, trihydroxytoluene, 1,2,4-trihydroxy-naphthalene, amino hyhydroquinonehydrobromide, and 5,6-dihydroxy indole.

In another method of carrying out the invention it is also possible to use reducing enzymes such as riboflavin, decarboxylase, the metalloporphyrines, etc.

Thus, in accordance with yet another method of carrying out the invention, certain tetrazolium salts such as 3-paranitrophenyl-2,5-diphenyl-tetrazolium chloride, may be used alone and without any associated reducing agent, since the enzymes in the skin are sufficient to reduce the tetrazolium salt to a colored formazane.

In accordance with one particular method of carrying out the invention, the composition containing the tetrazolium is applied to the skin first, and after it has dried, a second composition containing at least one reducing agent such as has been hereinbefore described is applied to the same area in order to bring out the color by reducing the tetrazolium salt.

A further object of the present invention is to provide a cosmetic composition adapted to be applied to the skin in order to carry out the above process, which composition contains at least one of the above-described tetrazolium salts.

In a preferred embodiment of the invention, this composition contains from 0.1 to 2% of the tetrazolium salt by weight.

The pH value of the composition according to the invention is preferably between 3 and 8.

The composition may take the form of an alcoholic solution, a cream, gel, or aerosol, and contain any additives conventionally used in cosmetic products of this general type, such for example as surface-active agents, perfume, etc.

In one alternative embodiment of the invention the composition also contains a reducing compound which is stable in the presence of a tetrazolium salt, but reduces the salt when the composition is in contact with the skin, the mol concentration of the reducing agent being between 0.1 and 10 times, and preferably between 0.5 and 2 times that of the tetrazolium salt.

In accordance with the invention the reducing compound included in the composition with the tetrazolium salt may be a hydroxybenzene dye such as those hereinbefore enumerated, or a hydroxynaphthalene dye.

The reducing compound included in the composition with the tetrazolium salt may also be a leuco derivative or an enzyme, as has already been pointed out.

In another embodiment the composition is packaged in two phases adapted to be separately applied, one after the other, one containing the tetrazolium salt and the other the reducing agent.

In order that the invention may be better understood, several methods of coloring the skin in accordance with the invention will now be described.

Example 1

A solution having the following composition is prepared:

3-paranitrophenyl-2,5-diphenyl-tetrazolium
  chloride _____g__ 0.39
Ethyl alcohol at 96°, q.s.p. _____cc__ 100

The skin is coated, using a wad of cotton, for example, with the above-described solution and it is found that after a certain time, for example about an hour, the area treated with the solution turns an orange red.

Example 2

The following solution is prepared:

Dihydroxyacetone _____g__ 20
Water, q.s.p. _____cc__ 100

Equal quantities of the solution described in Example 1 and the solution described in this example are mixed at the moment of use and this mixture is applied to the skin.

As soon as the product has dried, that is to say at the end of one minute, a rose beige color appears on the skin, which lasts several days, even after several washings.

Example 3

The following solution is prepared:

3-orthomethoxyphenyl-2,5-diphenyl-tetrazolium
  chloride _____g__ 0.1
Alcohol at 96° _____cm.³__ 55
Water, q.s.p. _____cc__ 100

This lotion is applied to the skin, and after the skin has dried, a second lotion having the following composition is prepared:

Trihydroxybenzene _____g__ 1
Ethyl alcohol at 96° _____cc__ 55
0.5 N solution of Na₂CO₃, q.s.p. _____pH__ 8
Water, q.s.p. _____cc__ 100

A reddish brown color appears on the skin when it dries, and this color does not wash off.

Example 4

A lotion having the following composition is prepared:

1,3,5-triphenyl tetrazolium chloride _____g__ 0.6
3,3'-para(diorthomethoxy) diphenylene-2,2'-5,5-
  diphenyl-para anisyl-ditetrazolium chloride__g__ 0.9
3,3'-para(diorthomethoxy) diphenylene-2,2'-5,5'-
  tetraphenyl-ditetrazolium chloride _____g__ 0.5
1,2,4-trihydroxy naphthalene _____g__ 0.70
Ethyl alcohol at 96° _____cc__ 75
Water, a.s.p. _____cc__ 100

This lotion is applied to the skin and it is found that a bright orange brown color appears immediately which is comparable to a copper bronze. The excess color may be removed by washing the skin with a wad of cotton impregnated with water. The color then becomes very stable and resists washing with soap or cleansing cream.

Among the leuco derivatives which can be ultilized to reduce tetrazolium salts there are the leuco derivatives of the methylene green,
the indigo sulfonate,
the thioindigo sulfonate,
the indigotine sulfonate,
the anthraquinone mono- and di-sulfonate.

Among the cosmetic supports which can be utilized there are waxes, mineral oils, cationic and non-anionic surface active agents (in particular oxyethylenated alkylphenol).

What is claimed is:

1. A process for coloring the skin, which comprises the step of topically applying to the skin an effective skin coloring amount of a composition containing in a solvent selected from the group consisting of water, ethyl alcohol and mixtures thereof, 0.1 to 2% of a tetrazolium salt corresponding to the formula:

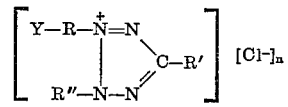

in which:

$n$ is a whole number equal to 1 or 2.

R is a radical selected from the group consisting of phenylene and phenylene substituted with a substituent selected from the group consisting of nitro and methoxy groups, R" is a radical selected from the group consisting of phenyl, and phenyl substituted with a substituent selected from the group consisting of nitro and methoxy groups, R' is selected from the group consisting of methyl, phenyl, phenyl substituted with a methoxy group,

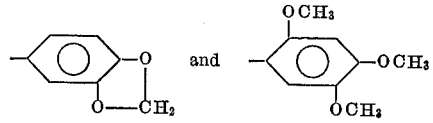

Y is selected from the group consisting of hydrogen when $n=1$ and a radical corresponding to the following formula:

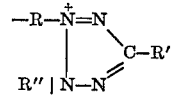

wherein R' and R" are the same as above defined and R is a radical selected from the group consisting of phenylene and phenylene substituted with a methoxy group when $n=2$; and leaving said composition in contact with the skin for about 1 minute to 1 hour.

2. The process according to claim 1 in which a skin compatible reducing agent is also applied to the skin in a molar concentration 0.1 to 10 times the concentration of the tetrazolium salt, said reducing agent being selected from the group consisting of: sodium hydrosulfite, sodium borohydride, sodium ascorbate, thioglycolic acid, thiolactic acid, glycol thioglycolate, glycol thiolactate, β-mercaptoethanol, trihydroxy benzene, trihydroxy toluene, 1,2,4-trihydroxy napthalene, amino hydroquinonehydrobromide, 5,6-dihydroxy indole, and riboflavin.

3. The process according to claim 1 in which a skin compatible reducing agent is also applied in a molar concentration 0.1 to 10 times the concentration of the tetrazolium salt, said reducing agent being trihydroxy benzene.

4. The process according to claim 1 in which a skin compatible reducing agent is also applied in a molar concentration 0.1 to 10 times the concentration of the tetrazolium salt, said reducing agent being 1,2,4-trihydroxy napthalene.

5. A process for coloring the skin, which comprises the step of topically applying to the skin an effective skin coloring amount of a composition containing in a solvent selected from the group consisting of water, ethyl alcohol and mixtures thereof, 0.1 to 2% of a tetrazolium salt selected from the group consisting of:
3-paranitrophenyl-2,5-diphenyl-tetrazolium chloride;
3-orthomethoxyphenyl-2,5-diphenyl-tetrazolium chloride;
3,3'-para-(diorthomethoxy)-diphenylene-2,2',5,5'-tetraphenylditetrazolium chloride;
3,3'-para-(diorthomethoxy)-diphenylene-2,2'-diphenyl-5,5'-para-anisyl-ditetrazolium chloride;
2,3,5-triphenyl-tetrazolium chloride;
3,3'-paradiphenylene-2,2',5,5'-tetraphenyl-ditetrazolium chloride;
3,3'-(diorthomethoxy-4,4'-diphenylene)-2,2'-diphenyl-5,5'-bis-(3,4-piperonyl-tetrazolium) chloride;
3,3'-(4,4'-diphenylene)-2,2'-bis-(phenyl)-5,5'-(4,4'-dimethoxyphenyl)-ditetrazolium chloride;
3-ortho-methoxyphenyl-2-phenyl-5-para-methoxyphenyl-tetrazolium chloride;
3-ortho-methoxyphenyl-2-phenyl-5-(3,4-piperonyl)-tetrazolium chloride;
3,2-diphenyl-5-para-methoxyphenyl-tetrazolium chloride;
3-ortho-methoxyphenyl-2-phenyl-5-(2,4,5-trimethoxyphenyl)-tetrazolium chloride;
3 para-nitrophenyl-2-phenyl-5-para-methoxyphenyl-tetrazolium chloride;
3-(2-methoxy-4-nitrophenyl)-2-phenyl-5-para-methocyphenyl tetrazolium chloride;
3-para-nitrophenyl-2-phenyl-5-(3,4-piperonyl)-tetrazolium chloride;
3-(2-methoxy-4-nitrophenyl)-2-phenyl-5-(3,4-piperonyl)-tetrazolium chloride; and
3-meta-nitrophenyl-2-phenyl-5-methyl-tetrazolium chloride; and leaving said composition in contact with the skin during 1 minute to about 1 hour.

6. The process according to claim 5 in which said composition has a pH between 3 and 8.

References Cited
UNITED STATES PATENTS

| | | | |
|---|---|---|---|
| 2,713,581 | 7/1955 | Pannone et al. | 260—308 |
| 2,948,657 | 9/1960 | Siccama et al. | 424—59 |

FOREIGN PATENTS

| | | | |
|---|---|---|---|
| 738,585 | 10/1955 | Great Britain | 260—308 |

ALBERT T. MEYERS, Primary Examiner

V. C. CLARKE, Assistant Examiner

U.S. Cl. X.R.

424—117, 63, 358, 365